(12) United States Patent
Kodama

(10) Patent No.: US 9,193,299 B2
(45) Date of Patent: Nov. 24, 2015

(54) STORAGE BOX WITH LIGHT GUIDE ILLUMINATION

(71) Applicant: TOYODA GOSEI CO., LTD., Kiyosu-shi, Aichi-ken (JP)

(72) Inventor: Yasuhiro Kodama, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 195 days.

(21) Appl. No.: 14/057,047

(22) Filed: Oct. 18, 2013

(65) Prior Publication Data

US 2014/0119043 A1    May 1, 2014

(30) Foreign Application Priority Data

Oct. 25, 2012    (JP) ................................. 2012-236055

(51) Int. Cl.
*A45C 15/06*    (2006.01)
*B60Q 3/02*    (2006.01)
*F21V 8/00*    (2006.01)

(52) U.S. Cl.
CPC .............. *B60Q 3/0243* (2013.01); *B60Q 3/022* (2013.01); *G02B 6/003* (2013.01); *G02B 6/0028* (2013.01)

(58) Field of Classification Search
CPC ........ A45C 15/00; A45C 15/06; B65D 43/20; B60Q 3/002; B60Q 3/022; B60Q 3/0243; B60Q 2500/00
See application file for complete search history.

(56) References Cited

U.S. PATENT DOCUMENTS

| 6,896,387 | B2* | 5/2005 | Renfro | 362/602 |
| 7,210,829 | B2* | 5/2007 | Okazaki et al. | 362/489 |
| 7,475,954 | B1* | 1/2009 | Latunski | 312/297 |
| 7,708,436 | B2* | 5/2010 | Lota | 362/488 |
| 7,954,871 | B2* | 6/2011 | Hipshier | 296/24.34 |
| 8,038,331 | B2* | 10/2011 | Kino et al. | 362/492 |
| 8,651,715 | B2* | 2/2014 | Stakoe et al. | 362/492 |
| 2006/0037713 | A1* | 2/2006 | Ichimaru et al. | 160/37 |
| 2006/0186696 | A1* | 8/2006 | Dobos et al. | 296/152 |
| 2010/0128493 | A1 | 5/2010 | Hipshier et al. | |
| 2011/0141760 | A1* | 6/2011 | Ory et al. | 362/555 |
| 2011/0157908 | A1* | 6/2011 | Iwai et al. | 362/509 |
| 2013/0242581 | A1* | 9/2013 | Ukai et al. | 362/459 |
| 2015/0062942 | A1* | 3/2015 | Shiraishi et al. | 362/490 |

FOREIGN PATENT DOCUMENTS

| JP | S63-128424 U | 8/1988 |
| JP | H06-023833 U | 3/1994 |
| JP | H06-278530 A | 10/1994 |
| JP | 2002-307994 A | 10/2002 |
| JP | 4079154 B2 | 2/2008 |
| JP | 2010-132031 A | 6/2010 |

OTHER PUBLICATIONS

Office Action issued Sep. 1, 2015 in the corresponding JP application No. 2012-236055 (with English translation).

* cited by examiner

*Primary Examiner* — Ismael Negron
(74) *Attorney, Agent, or Firm* — Posz Law Group, PLC

(57) ABSTRACT

A storage box includes a storage unit for storing an article, a lid unit slidably attached to the storage unit and adapted to open and close an opening portion of the storage unit, a light source unit attached to the storage unit, a first light guide body attached to the inside of the storage unit, a second light guide body attached to the inside of the lid unit, and a light emitting portion disposed on an upper surface of a front end of the lid unit, the light emitting portion defining a handle portion of the lid unit, and has a rectangular shape longer in a width direction of the lid unit.

8 Claims, 6 Drawing Sheets

STORAGE BOX WITH LIGHT GUIDE ILLUMINATION

CROSS-REFERENCE TO RELATED APPLICATIONS

This application claims the benefit of Japanese Patent Application Nos. 2012-236055 (filed on Oct. 25, 2012), the entire contents of which are hereby incorporated by reference.

BACKGROUND

1. Technical Field

The present invention relates to a storage box with illumination, and more particularly, a storage box with illumination, whose inside and outside can be illuminated.

2. Background Art

Conventionally, a storage box with illumination has been known, whose inside and outside are illuminated in different aspects upon opening and closing a lid thereof.

From Patent Document 1, there is disclosed a slide type storing device including a fixed tray on which a LED light source is fixed, a cup holder tray slidalbly attached on the fixed tray, and first and second light guide bodies provided on the cup holder tray. The first light guide body is adapted to emit light of the LED light source in a direction toward a lower portion of a holder portion of the cup holder tray, in a use state where the cup holder tray has been withdrawn, and the second light guide body is adapted to emit the light of the LED light source from a front surface of the cup holder tray, when the cup holder tray is retracted.

[Patent Document 1] Japanese Patent No. 4079154

According to the technique according to Patent Document 1, it is necessary to form the second light guide body in a shape with a broad width in a width direction of the cup holder tray in order to radiate and illuminate the light over a wide range in the width direction on the front side of the cup holder tray.

However, if the second light guide body is formed in a shape with a broad width, there is a problem in that the LED light source is directly projected on a light emitting surface (light emitting portion) intended to radiate the light, thereby causing a brightness difference (uneven light emission) in the light emitting surface.

In addition, because the shape of the second light guide body is limited by the internal structure of the cup holder tray, there is also a problem in that it is difficult to form the light guide body in a shape having a broad width and also a less light loss.

Accordingly, the present invention has been made keeping in mind the above problems, and an object thereof is to provide a storage box with illumination, in which the inside and outside of the storage box can be illuminated in different aspects upon opening and closing a lid thereof, and a brightness difference is not caused in a light emitting portion even if a light guide body is formed in a shape having a broad width and also a less light loss.

As a result of extensive studies to solve the above problems, the inventors have conceived the aspects of the present invention as described below.

SUMMARY OF THE INVENTION

First Aspect

A storage box with illumination includes a storage unit that stores an article, a lid unit that is slidably attached on the storage unit and adapted to open and close an opening portion of the storage unit, a light source unit that is attached and fixed on the storage unit and adapted to emit light, a first light guide body that is attached and fixed inside the storage unit, a second light guide body that is attached and fixed inside the lid unit, and a light emitting portion that is disposed on an upper surface of a front end of the lid unit, which is a handle portion of the lid unit, and has a shape whose width in a width direction of the lid unit is wider. The second light guide body includes an incident surface, into which light emitted from the light source unit is incident, and an emission surface for emitting the light incident from the incident surface, and has a sector shape whose width is widened form the incident surface toward the emission surface, and the incident surface is formed to be arranged at a location outside an end in a width direction of the light emitting portion. When the lid unit is closed, the light emitted from the light source unit is radiated from the light emitting portion, after being guided through the inside of the second light guide body and then emitted from the emission surface, thereby illuminating the outside of the lid unit. When the lid unit is opened, the light emitted from the light source unit is radiated to the inside of the storage unit after being guided through the inside of the first light guide body, thereby illuminating the inside of the storage unit.

According to the first aspect, the light emitting portion has a shape whose width in a width direction of the lid unit is wider, and when the lid unit is closed, the light emitted from the light source unit is radiated from the light emitting portion, after being guided through the inside of the first light guide body and then emitted from the emission surface. Therefore, the light can be illuminated over a wide range in the width direction on the front side of the lid unit.

As a result, because the front end of the lid unit, which is the handle portion of the lid unit, is illuminated when the lid unit is closed, a user can reach his hand for the front end while visually checking the front end, thereby easily opening the lid unit.

Also, according to the first aspect, the second light guide body has a sector shape whose width is widened form the incident surface toward the emission surface, and the incident surface of the second light guide body is formed to be arranged at a location outside an end in the width direction of the light emitting portion. Therefore, the incident surface of the second light guide body and the light source unit are not directly projected on the light emitting portion, thereby preventing a brightness difference (uneven light emission) from being caused in the light emitting portion.

In addition, by forming the second light emitting body in the above shape, the shape of the second light guide body is hardly limited by the internal structure of the lid unit or the structure of the upper surface of the storage unit opposing the lid unit. Therefore, the second light guide body can be formed in a shape having a broad width and also a less light loss.

Second Aspect

In the storage box with illumination of the first aspect, the second light guide body has an asymmetric shape in the width direction, in which lengths of two side surfaces thereof are different from each other, and an attaching portion for attaching and fixing the second light guide body inside the lid unit is formed on a side surface of two side surfaces of the second light guide body, which has a shorter length.

According to the second aspect, because the attaching portion is formed on the shorter side surface of the second light guide body, a shadow of the attaching portion is not projected on the light emitting portion, thereby preventing a brightness difference from being caused in the light emitting portion.

Third Aspect

In the storage box with illumination of the first aspect, an optical axis of the light source unit is set toward an upper side of the storage unit, and when the lid unit is closed, the incident surface of the second light guide body is intersected with the optical axis.

According to the third aspect, the light source unit does not interfere with sliding of the lid unit, and also the light emitted from the light source unit can be surely incident into the incident surface of the second light guide body.

Fourth Aspect

In the storage box with illumination of any one of the first aspect to the third aspect, the second light guide body comprises a reflection surface for reflecting the light incident from the incident surface to the emission surface.

According to the fourth aspect, because the second light guide body has the reflection surface, the light incident into the incident surface of the second light guide body can be surely guided to the emission surface.

Fifth Aspect

In the storage box with illumination of the fourth aspect, the reflection surface of the second light guide body is made by an inclined surface formed on a surface of a bent corner portion of the second light guide body, and the inclined surface has an inward curved shape.

According to the fifth aspect, because the reflections surface is made by an inclined surface formed on a surface of a bent corner portion of the second light guide body, the reflection surface of the second light guide body can be easily formed, as compared with a configuration, in which the reflection surface is formed as a member separate from a light guide body (e.g., as in Patent Document 1, a configuration, in which a metal reflection plate is obliquely inserted inside a light guide body).

In addition, according to the fifth aspect, because the inclined surface, which is the reflection surface of the second light guide body, has an inward curved shape, the light reflected from the reflection surface 62 is spread along the curved shape, so that the light can be guided everywhere in a sector shape whose width is widened form the incident surface of the second light guide body toward the emission surface, thereby preventing a brightness difference from being caused in the emission surface of the second light guide body and the light emitting portion.

Sixth Aspect

In the storage box with illumination of the first aspect to the fifth aspect, the storage box further includes a light focusing lens opposing the light source unit, and when the lid unit is closed, the light emitted from the light source unit is focused by the light focusing lens and then emitted to the incident surface of the second light guide body.

According to the sixth aspect, the light emitted from the light source unit can be surely incident into the incident surface of the second light guide body.

Seventh Aspect

In the storage box with illumination of the sixth aspect, the light focusing lens is integrally formed with the first light guide body.

According to the seventh aspect, the operation and effect of the sixth aspect can be achieved without causing increased costs due to increase of the number of components.

Eighth Aspect

In the storage box with illumination of the first aspect to the seventh aspect, the storage box further includes a slide mechanism for sliding the lid unit relative to the storage unit, and the slide mechanism is formed at a location apart from the light source unit.

According to the eighth aspect, it can be surely prevented that the light emitting unit 40 interferes with sliding of the lid unit 30.

DESCRIPTION OF EMBODIMENTS

Figure 1:
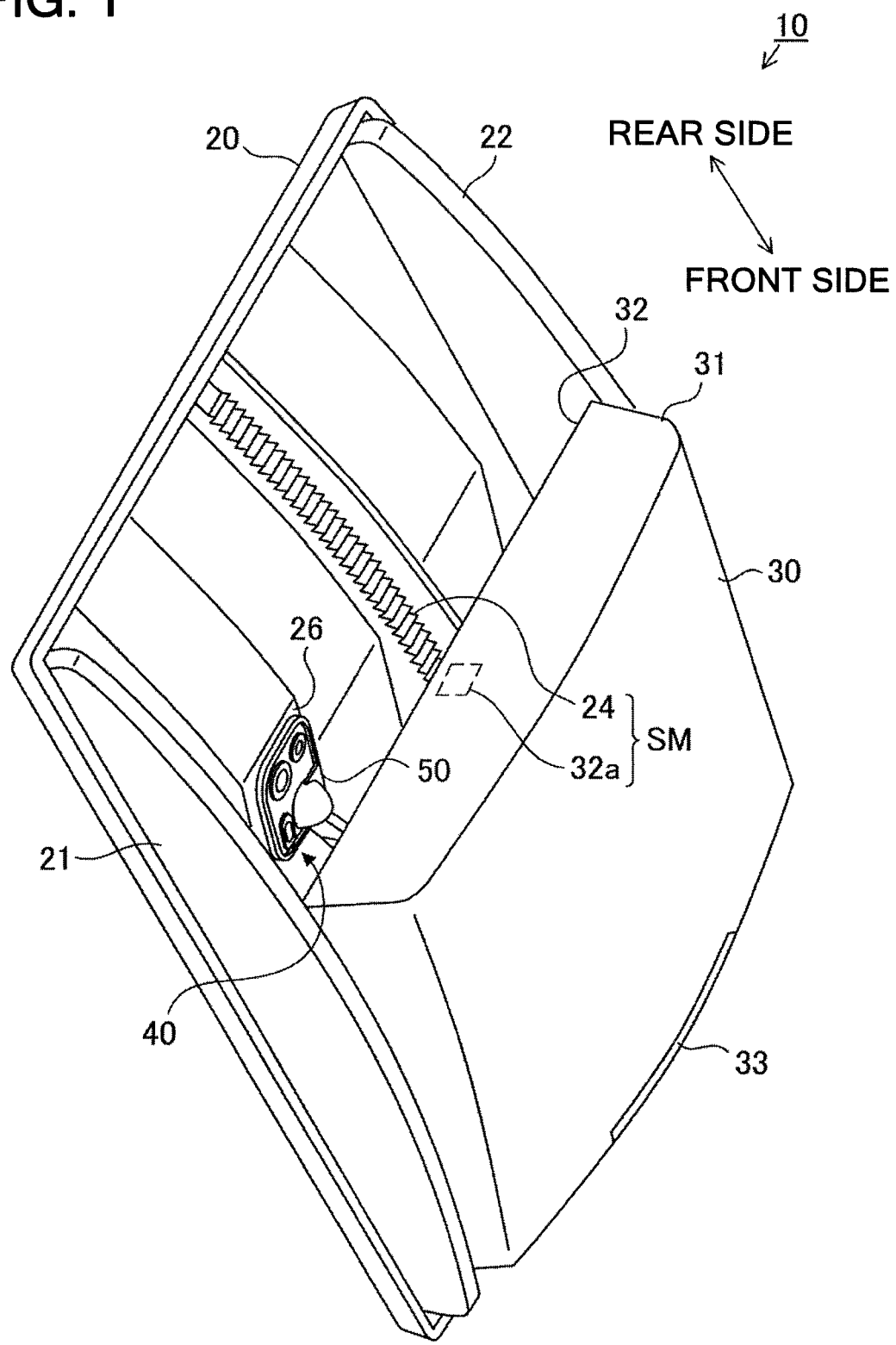
FIG. 1 is a perspective view of a storage box with illumination according to one embodiment for embodying the present invention, showing a state where a lid unit 30 of the storage box with illumination 10 is closed.

One embodiment for embodying the present invention will be now described with reference to the accompanying drawings. In each figure, geometries and installation positions of components thereof are schematically illustrated in an exaggerated manner for clarity of explanation, and accordingly the geometry and installation position of each component are different from the real thing.

As shown in FIGS. 1 to 6, a storage box with illumination 10 (a storage box with illumination) according to the present embodiment includes a storage unit 20 (side walls 21 and 22, a cup holder 23, an opening portion 23a, a guide rib 24, an attaching hole 25, an attaching portion 26, a threaded hole 26a, and engaging protrusions 26b and 26c), a lid unit 30 (a cover portion 31, a supporting and fixing portion 32, engaging protrusions 32a to 32c, an opening portion 32d, and an light emitting portion 33), a light source unit 40 (a light emitting element 41, an insulation substrate 42, a housing 43, an optical axis L), a first light guide body 50 (a flat portion 51, an incident surface 52, a light guide portion 53, an emission surface 54, a light focusing lens 55, a threaded hole 56, and positioning holes 57 and 58), a second light guide body 60 (an incident surface 61, a reflection surface 62, a emission surface 63, attaching portions 64a and 64b, and a gate portion 64c), a male screw BS, a slide mechanism SM (the guide rib 24, and the engaging protrusion 32a), and the like, and is used as a cup holder for a vehicle intended to be installed in a center console of the vehicle.

Meanwhile, in the following description, the terms 'front side' and 'forward side' refer to a lower side as shown in FIGS. 1 to 6.

Also, the term 'rear side' is opposite to the 'front side' and 'forward side', and refers to an upper side as shown in FIGS. 1 to 6.

In addition, the term 'right side' refers to a right side in a front view of the storage box with illumination 10 as viewed from the font side, the term 'left side' refers to a left side in the front view of the storage box with illumination 10, and the term 'left-right direction' refers to a width direction of the storage unit 20 and the lid unit 30 of the storage box with illumination 10.

As shown in FIGS. 1, 2, 5 and 6, the side walls 21 and 22 are provided to be erected on both left and ride sides of a upper surface of the storage unit (storing unit) 20, the cup holder 23 is formed to be disposed on the front side of the storage unit 20, the guide rib 24 is formed to be disposed in a portion of a middle section of a rear upper surface of the storage unit 20, where is opposed to the lid unit 30, the attaching hole 25 is formed to extend through a portion of a left section of the rear upper surface of the storage unit 20, which is opposed to the lid unit 30, and the attaching portion 26 is formed to be disposed on the rear side of the attaining hole 25 in the left section of the upper surface of the storage unit 20.

The storage unit 20 is integrally formed by injection-molding a not-transparent synthetic resin material, through which light from the light source unit 40 is not transmitted.

Figure 2:
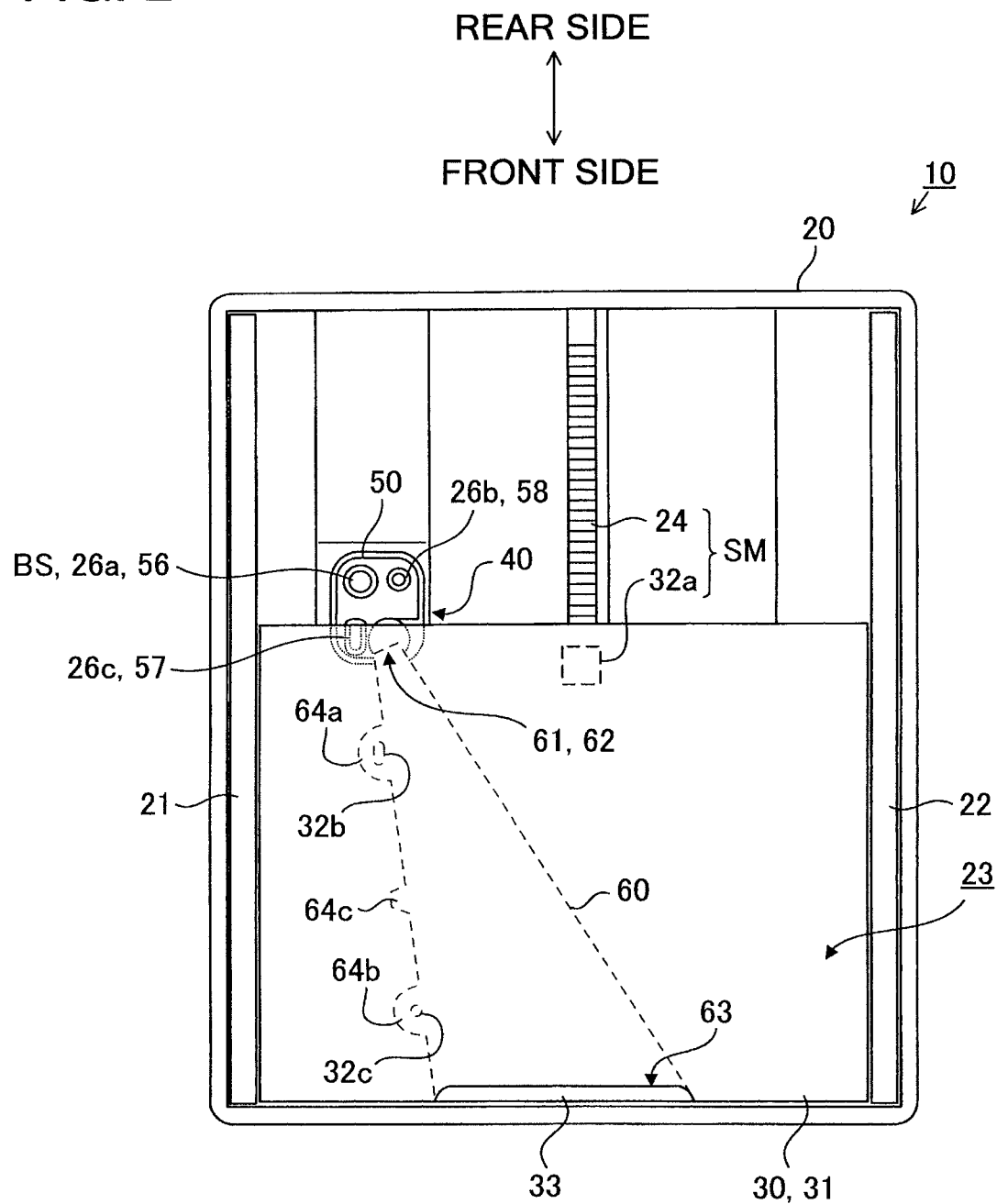
FIG. 2 is a top view of the storage box with illumination 10.
Figure 3:
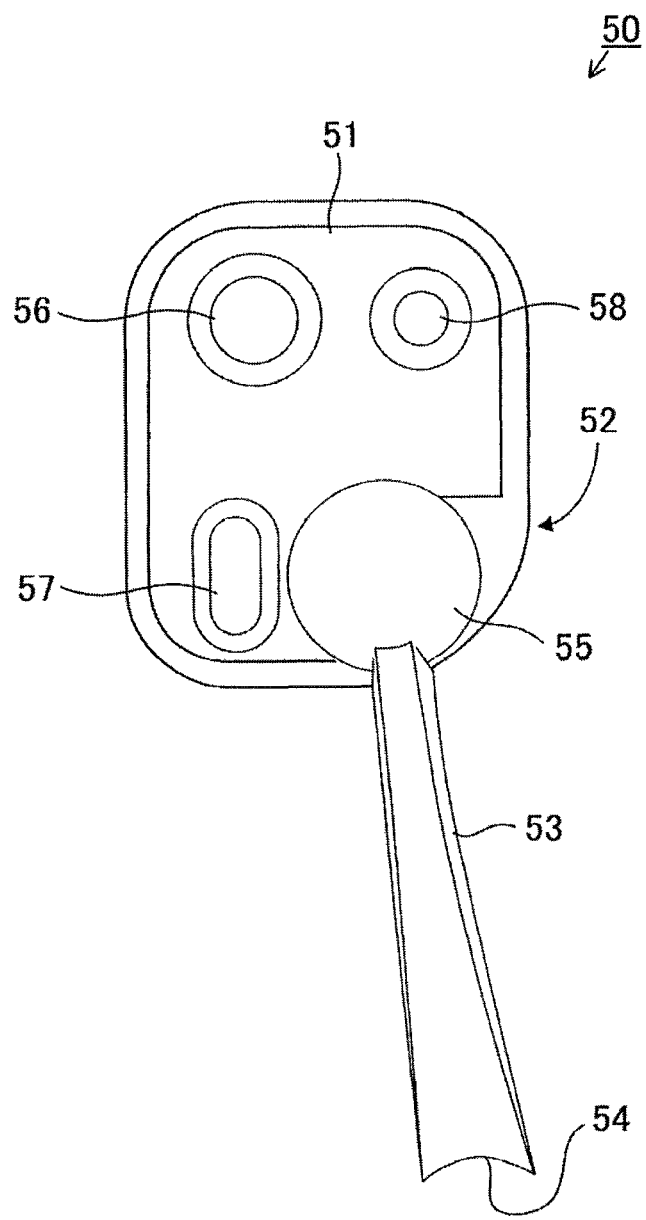
FIG. 3 is a top view of a first light guide body 50 of the storage box with illumination 10.

As shown in FIGS. 1 and 2, the side walls 21 and 22 have a shape of a plate with a certain thickness.

Figure 5:
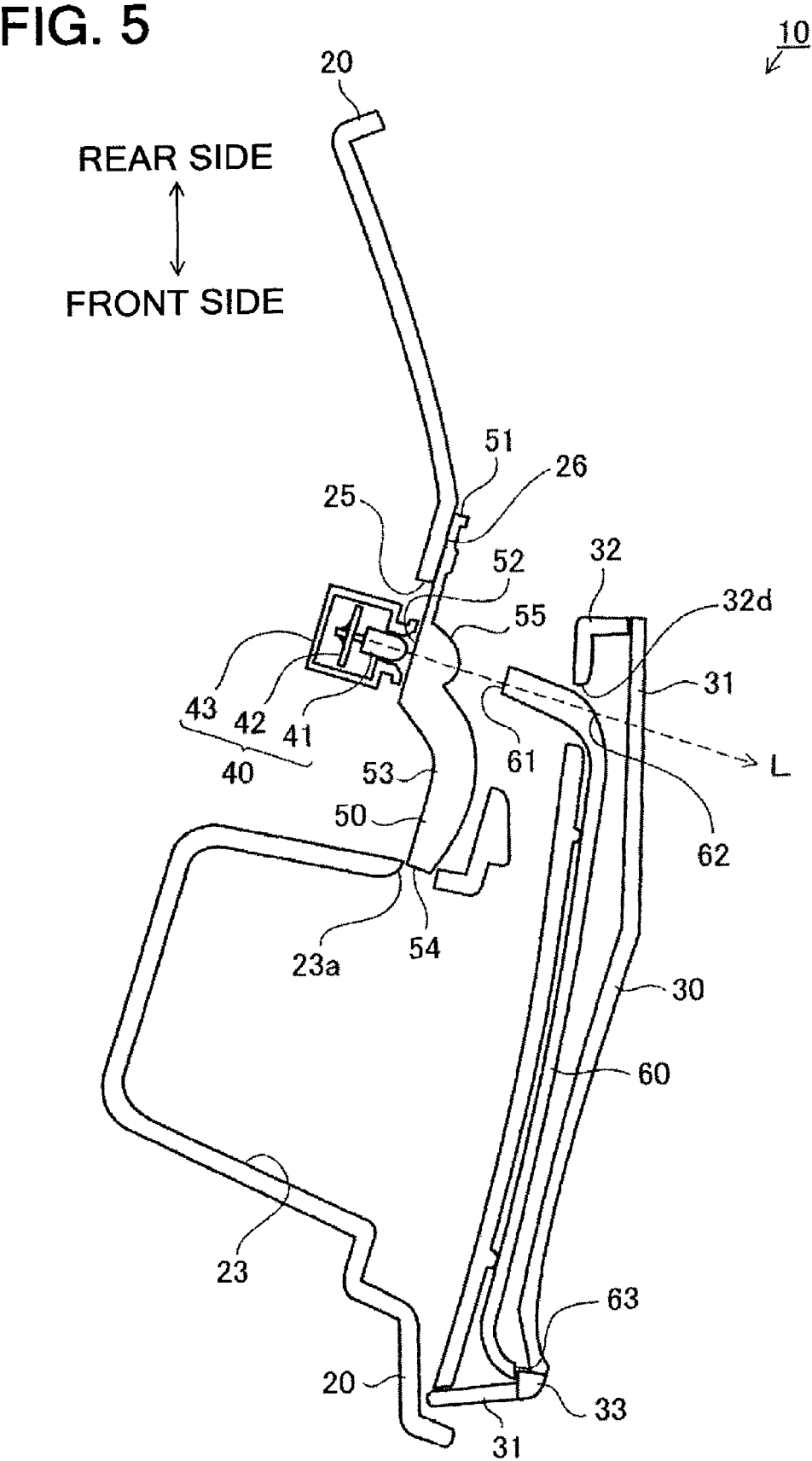
FIG. 5 is an end view (end view as viewed in a direction of an arrow X-X shown in FIG. 2) of a longitudinally sectioned surface of the storage box with illumination 10, showing a state where the lid unit 30 is closed.
Figure 6:
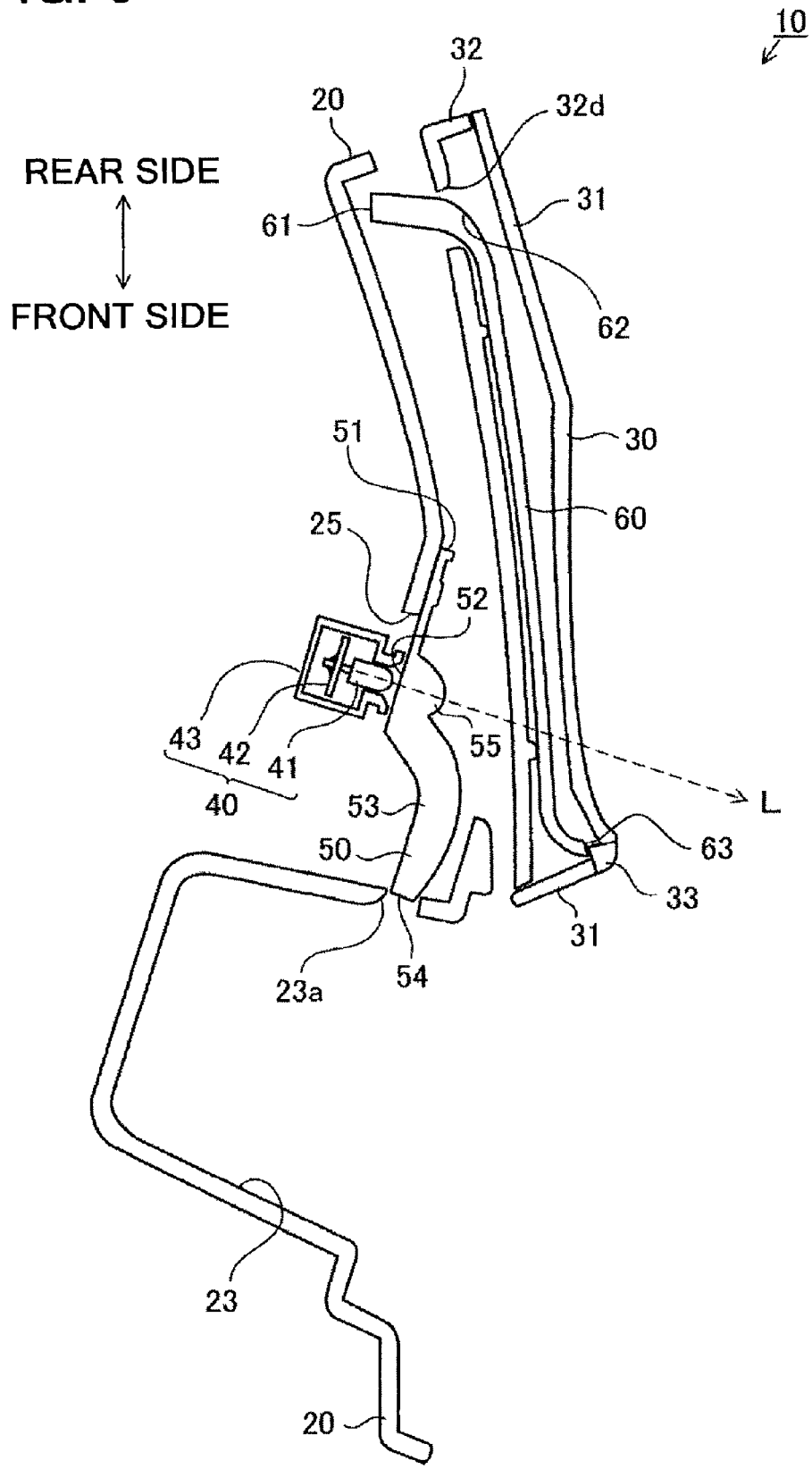
FIG. 6 is an end view of a longitudinally sectioned surface of the storage box with illumination 10, showing a state where the lid unit 30 is opened.

As shown in FIGS. 5 and 6, the cup holder 23 has a shape of a box opened on an upper surface thereof, and the opening portion 23a is formed to extend through a rear inner wall of the cup holder 23.

In the cup holder 23, a cup (not shown) of a beverage container, which is an article, is received.

As shown in FIGS. 1 and 2, the guide rib 24 has a shape of a rack formed by gear-cutting an elongated flat plate, and is provided to be arranged on a generally middle section in the left-right direction of the storage unit 20 in a front-rear direction of the storage unit 20 and also to be arranged in parallel to the side walls 21 and 22.

As shown in FIGS. 1 and 2, an upper surface of the attaching portion 6 is formed flat. In the attaching portion 26, the threaded hole 26 is formed to extend therethrough, and also, the engaging protrusions 26b and 26c are provided to protrude toward the upper surface side thereof.

As shown in FIGS. 1, 2, 5 and 6, the lid unit 30 includes the cover portion 31 provided on an upper surface side of the storage box with illumination 10, the supporting and fixing portion 32 provided on a lower surface side of the cover portion 31, and the light emitting portion 33 with a generally elongated rectangular shape disposed on an upper surface of a front end of the cover portion 31, which is a handle portion of the lid unit 30, and also extending in the left-right direction of the cover portion 31.

The engaging protrusion 32a is provided to protrude from a lower surface of the supporting and fixing portion 32, and the opening portion 32d is formed to extend through the supporting and fixing portion 32.

The cover portion 31 and the supporting and fixing portion 32 are integrally formed by injection-molding a not-transparent synthetic resin material, through which light from the light source unit 40 is not transmitted.

As shown in FIGS. 1 and 5, the lid unit 30 is fitted between the side walls 21 and 22 of the storage unit 20, the engaging protrusion 32a of the supporting and fixing portion 32 of the lid unit 30 is engaged with the guide rib 24 of the storage unit 20, and while the lid unit 30 has been closed, the lid unit 30 is closed to cover the cup holder 23 of the storage unit 20.

As shown in FIGS. 1 and 2, when the lid unit 30 is closed and opened, the engaging protrusion 32a of the supporting and fixing portion 32 of the lid unit 30 is slid while engaging with the guide rib 24 of the storage unit 20.

As shown in FIGS. 1, 2, 5 and 6, the light emitting portion 33 is formed by injection-molding a transparent synthetic resin material, through which light from the light source unit 40 is transmitted, and a thin plating layer (not shown) capable of transmitting the light is formed on a surface of the light emitting portion 33. The light emitting portion 33 is fitted in an attaching hole formed to extend through the cover portion 31, and the surface (the plating layer) of the light emitting portion 33 is exposed from the cover portion 31.

As shown in FIGS. 5 and 6, the light source unit 40 includes the insulation substrate 42, on which the light emitting element 41 is placed (mounted), and the housing 43 for receiving the light emitting element 41 and the insulation substrate 42.

The light emitting element 41 is a semiconductor light emitting element (e.g., a LED, an organic LED, or the like), and a light-emitting portion provided on a distal end side of the light emitting element 41 with a generally shell shape is exposed from a lower surface side of the housing 43.

The housing 43 is formed by injection-molding a synthetic resin material and is attached and fixed on the lower surface of the storage unit 20.

The distal end side of the light emitting element 41 is exposed the attaching hole 25 of the storage unit 20.

The optical axis L of the light source unit 40 (i.e., the light emitting element 41) is oriented toward an upper side of the storage unit 20.

The light emitting element 41 is connected to a lighting circuit (not shown) placed on the insulation substrate 42, the lighting circuit is connected with an external connection terminal (not shown), and the external connection terminal protrudes from the lower surface side of the storage unit 20 toward the outside.

The light source unit 40 is supplied with an electric power from an external power supply, and a power supply cable (not shown) of the external power supply is electrically connected to the external connection terminal.

The lighting circuit placed on the insulation substrate 42 creates an internal electric power with predetermined electric current and voltage from an external electric power supplied through the external connection terminal, and then outputs the internal electric power to the light emitting element 41, thereby turning the light emitting element 41 on.

As shown in FIGS. 1 to 3, 5, and 6, the first light guide body 50 includes the flat portion 51 having a flat plate shape, the incident surface 52 formed to be arranged on a lower surface of the flat portion 51, the light guide portion 53 of a flat plate shape extending from a upper surface of the flat portion 51, the emission surface 54 formed to be arranged on a distal end of the light guide portion 53, the light focusing lens (convex lens) 55 of a shell shape provided to protrude from the upper surface of the flat portion 51 located above the incident surface 52, the threaded hole 56 extending through the flat portion 51, and the positioning holes 57 and 58 provided to protrude from the upper surface of the flat portion 51.

The positioning hole 57 is formed to be arranged on a left side of the light focusing lens 55, and the positioning hole 58 is formed to be arranged on a rear side of the light focusing lens 55.

As shown in FIGS. 1 and 2, the flat portion 51 of the first light guide body 50 is positioned with respect to the storage unit 20 on a upper surface side of the attaching portion 26 of the storage unit 20 by screwedly attaching the male screw BS into the threaded hole 56 of the first light guide body 50 and the threaded hole 26a of the attaching portion 26 and engaging the engaging protrusions 26b and 26c, respectively, to the positioning holes 57 and 58 of the first light guide body 50, and in this state, the first light guide body 50 is attached and fixed to the storage unit 20.

As shown in FIGS. 5 and 6, the incident surface 52 of the first light guide surface 50 is exposed from the attaching hole 25 of the storage unit 20, and the incident surface 52 is opposed to the distal end of the light emitting element 41. Also, the incident surface 52 is intersected with the optical axis L of the light source unit 40 (i.e., the light emitting element 41), and the optical axis L is arranged to be aligned with an optical axis of the light focusing lens 55.

The emission surface 54 of the first light guide body 50 is exposed from the opening portion 23a of the cup holder 23 of the storage unit 20.

As shown in FIGS. 2, 4 to 6, the second light guide body 60 includes the incident surface 61 formed to be arranged on a lower surface side thereof, the reflection surface 62 formed to be obliquely arranged above the incident surface 61, and the emission surface 63 formed to be arranged on an upper surface side thereof and also on the front side of the reflection surface 62, and is formed in a sector shape, in which a width thereof in the left-right direction is widened from the incident surface 61 toward the emission surface 63, and also in a generally flat shape curved in a facing direction thereof.

The second light guide body 60 has a right and left asymmetric shape, in which a length of a right side surface thereof is longer than a length of a left side surface. Also, the attaching portions 64a and 64b are respectively provided to protrude on front and rear sides of the left side surface in a facing direction thereof, and the gate portion 64c is provided to protrude between the attaching portions 64a and 64b on the left side surface in the facing direction.

As shown in FIGS. 4A to 6, the reflection surface 62 of the second light guide body 60 is made by an inclined surface formed on a surface of a bent corner portion of the second light guide body 60.

Figure 4A:
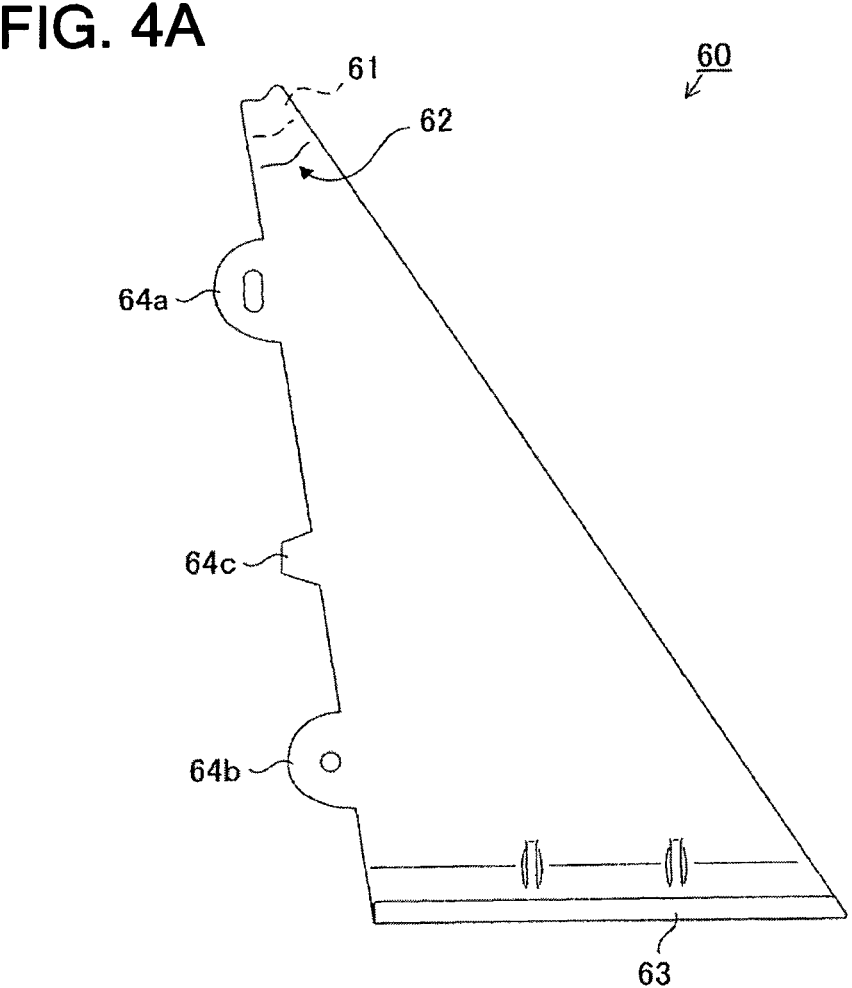
FIG. 4A is a top view of a second light guide body 60 of the storage box with illumination 10 and FIG. 4B is a top view of a main part of the second light guide body 60.
Figure 4B:
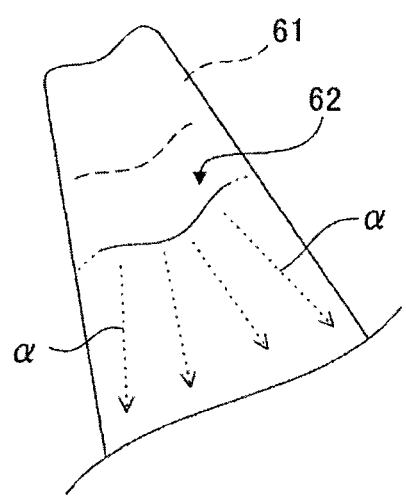

As shown in FIGS. 4A and 4B, the inclined surface, which is the reflection surface 62 of the second light guide body 60, is formed in an inward curved shape.

The reflection surface 62 of the second light guide body 60 is processed into a flat shape without fine unevenness and thus is adapted to prevent light from being scattered in an interface thereof. On the reflection interface, light is reflected in a predetermined direction by interfacial reflection or total reflection depending on refractive index difference.

As shown in FIGS. 5 and 6, the second light guide body 60 is received between the cover portion 31 and the supporting and fixing portion 32 of the lid unit 30 (i.e., inside the lid unit 30), and the incident surface 61 of the second light guide body 60 protrudes downward from the opening portion 34d of the lid unit 30.

As shown in FIGS. 2 and 4, engaging holes formed to extend through the attaching portions 64a and 64b of the second light guide body 60 are engaged to the engaging protrusions 32b and 32c of the supporting and fixing portion 32 to be positioned with respect to the supporting and fixing portion 32, and in this state, the second light guide body 60 is attached and fixed inside the lid unit 30.

As shown in FIG. 2, the incident surface 61 and the reflection surface 62 of the second light guide body 60 are formed to be arranged at a location outside a left end in the left-right direction of the light emitting portion 33, in a state where the second light guide body 60 is attached and fixed inside the lid unit 30.

As shown in FIG. 5, when the lid unit 30 is closed, the optical axis L of the light emitting unit 40 is arranged to be intersected with the incident surface 61 of the second light guide body 60.

As shown in FIGS. 5 and 6, the emission surface 63 of the second light guide body 60 is in surface contact with a rear surface of the light emitting portion 33 of the lid unit 30.

Therefore, light emitted from the emission surface 61 and incident into the light emitting portion 33 can reduce a light loss which would otherwise be lost between the emission surface 63 and the light emitting portion 33.

The emission surface 63 of the second light guide body 60 is formed to have a length in the left-right direction thereof substantially equal to a length in the left-right direction of the light emitting portion 33, and the substantially entire in the left-right direction of the emission surface 63 is in surface contact with the light emitting portion 33.

Alternatively, the emission surface 63 and the light emitting portion 33 may be integrally formed so that the emission surface 63 is exposed as the light emitting portion 33 from the lid unit 30.

The light guide bodies 50 and 60 are integrally formed by injection-molding a transparent synthetic resin material (e.g., acrylic, polycarbonate, or the like).

Upon injection-molding the second light guide body 60, the synthetic resin material is injected from the gate portion 64c.

It will be sufficient if detailed geometries of the light guide bodies 50 and 60 are set to optimal geometries based on experiments, simulations or the like to surely obtain operations and effects as described below.

[Illumination Configuration when the Lid Unit 30 is Closed]

As shown in FIGS. 1, 2 and 5, when the lid unit 30 is closed, the lid unit 30 is closed to cover the cup holder 23 of the storage unit 20, and the light emitting portion 33 of the lid unit 30 is exposed on the front upper surface side of the storage box with illumination 10.

Also, when the lid unit 30 is closed, the incident surface 61 of the second light guide body 60 is opposed to the distal end of the light focusing lens 55 of the first light guide body 50 with a gap interposed therebetween. The incident surface 61 of the second light guide body 60, the focusing lens 55 and the incident surface 52 of the first light guide body 50, and the light emitting element 41 of the light source unit 40 are arranged on a straight line, and the incident surfaces 61 and 52 are perpendicular to the optical axis L of the light source unit 40 (i.e., the light emitting element 41).

Therefore, light emitted from the light emitting element 41 is firstly incident into the incident surface 52 of the first light guide body 50 and focused by the light focusing lens 55. Then, the light is incident into the incident surface 61 of the second light guide body 60 and subsequently reflected by the reflection surface 62. Next, after being guided through the inside of the second light guide body 60, the light is emitted from the emission surface 63 and then passes through the light emitting portion 33 to be radiated. As a result, the front upper surface of the storage box with illumination 10 is illuminated.

In this case, because a surface of the light emitting portion 33 exposed from the cover portion 31 of the lid unit 30 has an elongated rectangular shape whose width in a width direction (the left-right direction) of the cover portion 31 is wider, the surface can radiate and illuminate light over a wide range in the left-right direction on the front side of the storage box with illumination 10.

[Illumination Configuration when the Lid Unit 30 is Opened]

As shown in FIG. 6, when the lid unit 30 is opened, the cup holder 23 of the storage unit 20 is exposed.

Light emitted from the light emitting element 41 is firstly incident into the incident surface 52 of the first light guide body 50 and guided through the inside of the light guide portion 53. Then, the light is emitted from the emission surface 54 and radiated into the cup holder 23 through the opening portion 23a of the cup holder 23. As a result, the inside of the cup holder 23 is illuminated.

In this case, when the lid unit 30 is opened, the incident surface 61 of the second light guide body 60 is moved toward the rear side of the storage unit 20 and the incident surface 61 is not intersected with the optical axis L of the light source unit 40. Therefore, the light is not guided through the inside of the second light guide body 60 and also is not radiated from the light emitting portion 33 of the lid unit 30.

However, although, even when the lid unit 30 is closed, the light emitted from the light emitting element 41 is radiated into the cup holder 23 through the emission surface 54 of the first light guide body 50, the inside of the cup holder 23 cannot be viewed from the outside if the lid unit 30 is closed.

[Operations and Effects of the Storage Box with Illumination 10]

According to the storage box with illumination 10 of the present embodiment, the following operations and effects can be achieved.

[1] The storage box with illumination 10 includes a storage unit 20; a lid unit 30 slidably attached on the storage unit 20 and adapted to open and close an upper surface side of a cup holder 23, which is an opening portion of the storage unit 20; a light source unit 40 attached and fixed on the storage unit 20 and adapted to emit light; a first light guide body 50 attached and fixed inside the storage unit 20; a second light guide body 60 attached and fixed inside the lid unit 30; and a light emitting portion 33 disposed on an upper surface of a front end of the lid unit 30, which is a handle portion of the lid unit 30, and having a shape whose width in a width direction of the lid unit 30 is wider.

The second light guide body 60 includes an incident surface 61, into which light emitted from the light source unit 40 is incident, and an emission surface 63 for emitting the light incident from the incident surface 61, and has a sector shape whose width is widened form the incident surface 61 toward the emission surface 63, and the incident surface 61 is formed to be arranged at a location outside an end in a width direction of the light emitting portion 33.

When the lid unit 30 is closed, the light emitted from the light source unit 40 is radiated from the light emitting portion 33, after being guided through the inside of the second light guide body 60 and then emitted from the emission surface 54, thereby illuminating the outside of the lid unit 30.

When the lid unit 30 is opened, the light emitted from the light source unit 40 is radiated into the cup holder 23 (the inside of the storage unit 20), after being guided through the inside of the first light guide body 50, thereby illuminating the inside of the cup holder 23.

According to the storage box with illumination 10, the light emitting portion 33 has a shape whose width in a width direction of the lid unit 30 is wider, and when the lid unit 30 is closed, the light emitted from the light source unit 40 is radiated from the light emitting portion 33, after being guided through the inside of the first light guide body 50 and then emitted from the emission surface 54. Therefore, the light can be illuminated over a wide range in the width direction on the front side of the lid unit 30.

As a result, because the front end of the lid unit 30, which is the handle portion of the lid unit 30, is illuminated when the lid unit 30 is closed, a user can reach his hand for the front end while visually checking the front end, thereby easily opening the lid unit 30.

Also, according to the storage box with illumination 10, the second light guide body 60 has a sector shape whose width is widened form the incident surface 61 toward the emission surface 63, and the incident surface 61 of the second light guide body 60 is formed to be arranged at a location outside an end in the width direction of the light emitting portion 33. Therefore, the incident surface 61 and the reflection surface 62 of the second light guide body 60 and the light source unit 40 are not directly projected on the light emitting portion 33, thereby preventing a brightness difference (uneven light emission) from being caused in the light emitting portion 33.

In addition, by forming the second light emitting body 60 in the above shape, the shape of the second light guide body 60 is hardly limited by the internal structure of the lid unit 30 (in particular, the supporting and fixing portion 32), or the structure of the rear upper surface of the storage unit 20 opposing the lid unit 30 (in particular, the guide rib 24). Therefore, the second light guide body 60 can be formed in a shape having a broad width and also a less light loss.

[2] The second light guide body 60 has an asymmetric shape in the width direction, in which lengths of two side surfaces thereof are different from each other, and attaching portions 64a and 64b for attaching and fixing the second light guide body 60 inside the lid unit 30, and a gate portion 64c are formed on a side surface of two side surfaces of the second light guide body 60, which has a shorter length.

Therefore, shadows of the attaching portions 64a and 64b and the gate portion 64c are not projected on the light emitting portion 33, thereby preventing a brightness difference from being caused in the light emitting portion 33.

[3] An optical axis of the light source unit 40 is oriented toward an upper side of the storage unit 20, and when the lid unit 30 is closed, the incident surface 61 of the second light guide body 60 is intersected with the optical axis.

Therefore, the light source unit 40 does not interfere with sliding of the lid unit 30, and also the light emitted from the light source unit 40 can be surely incident into the incident surface 61 of the second light guide body 60.

[4] The second light guide body 60 includes a reflection surface 62 for reflecting the light incident from the incident surface 61 to the emission surface 63, and therefore, the light incident into the incident surface 61 of the second light guide body 60 can be surely guided to the emission surface 63.

[5] The reflection surface 62 is made by an inclined surface formed on a surface of a bent corner portion of the second light guide body 60, and therefore, the reflection surface 62 of the second light guide body 60 can be easily formed, as compared with a configuration, in which the reflection surface 62 is formed as a member separate from a light guide body (e.g., as in Patent Document 1, a configuration, in which a metal reflection plate is obliquely inserted inside a light guide body).

Also, as shown in FIG. 4B, because the inclined surface, which is the reflection surface 62 of the second light guide body 60, has an inward curved shape, the light reflected from the reflection surface 62 is spread along the curved shape as shown in arrows α, so that the light can be guided everywhere in a sector shape whose width is widened form the incident surface 61 of the second light guide body 60 toward the emission surface 63, thereby preventing a brightness difference from being caused in the emission surface 63 of the second light guide body 60 and the light emitting portion 33.

[6] A light focusing lens 55 opposing the light source unit 40 is included, and when the lid unit 30 is closed, the light emitted from the light source unit 40 is focused by the light focusing lens 55 and then emitted to the incident surface 61 of the second light guide body 60, and therefore, the light emitted from the light source unit 40 can be surely incident into the incident surface 61 of the second light guide body 60.

[7] The light focusing lens 55 is integrally formed with the first light guide body 50, and therefore, the operation and effect of the above [6] can be achieved without causing increased costs due to increase of the number of components.

[8] A slide mechanism SM is constituted by an engaging protrusion 32a of a supporting and fixing portion 32 of the lid unit 30 and a guide rib 24 of the storage unit 20, and when the lid unit 30 is opened and closed, the lid unit 30 is slid relative to the storage unit 20 while the engaging protrusion 32a is engaged with the guide rib 24.

In addition, the slide mechanism SM is formed at a location apart from the light source unit 40, and therefore, it can be surely prevented that the light emitting unit 40 interferes with sliding of the lid unit 30.

Other Embodiments

Although the storage box with illumination 10 according to the foregoing embodiment is applied to a vehicle cup holder box, the present invention may be applied to a center console box for a vehicle, and also is not limited to those in the vehicle, but may be applied to a storage box with illumination used in any locations.

The present invention is not intended to be limited to the descriptions of the above aspects and the above embodiments. The invention also includes various modifications within a range which can be readily contemplated by those skilled in the art without departing from the appended claims. Contents of papers, patent applicant publications and patents which are referred herein are intended to be incorporated by reference in its entirety.

What is claimed is:

1. A storage box with illumination comprising:
   a storage unit for storing an article;
   a lid unit slidably attached to the storage unit and adapted to open and close an opening portion of the storage unit;
   a light source unit attached and fixed to the storage unit and adapted to emit light;
   a first light guide body attached to the inside of the storage unit;
   a second light guide body attached to the inside of the lid unit; and
   a light emitting portion disposed on an upper surface of a front end of the lid unit, defining a handle portion of the lid unit, and having a shape with a largest dimension in a width direction of the lid unit;
   wherein the second light guide body includes an incident surface, into which light emitted from the light source unit is incident, and an emission surface for emitting the incident light incident, and wedge shape whose width increases from the incident surface toward the emission surface, and the incident surface is formed to be arranged at a location outside an end along a width direction of the light emitting portion;
   wherein, when the unit is closed, the light emitted from the light source is projected from the light emitting portion, after being guided through the inside of the second light guide body and then emitted from the emission surface, thereby illuminating the outside of the lid unit; and
   wherein, when the lid unit is opened, the light emitted from the light source unit is projected to the inside of the storage unit after being guided through the inside of the first light guide body, thereby illuminating the inside of the storage unit.

2. The storage box with illumination according to claim 1, wherein the second light guide body has an asymmetric shape in the width direction, in which lengths of two side surfaces thereof are different from each other, and
   an attaching portion for attaching and fixing the second light guide body inside the lid unit is formed on a side surface of two side surfaces of the second light guide body, which has a shorter length.

3. The storage box with illumination according to claim 1, wherein an optical axis of the light source unit is set toward an upper side of the storage unit; and
   when the lid unit is closed, the incident surface of the second light guide body is intersected with the optical axis.

4. The storage box with illumination according to claim 1, further comprising a slide mechanism for sliding the lid unit relative to the storage unit,
   wherein the slide mechanism is formed at a location apart from the light source unit.

5. The storage box with illumination according to claim 1, wherein the second light guide body comprises a reflection surface for reflecting the light incident from the incident surface to the emission surface.

6. The storage box with illumination according to claim 5, wherein the reflection surface of the second light guide body is made by an inclined surface formed on a surface of a bent corner portion of the second light guide body, and the inclined surface has an inward curved shape.

7. The storage box with illumination according to claim 1, further comprising a light focusing lens opposing the light source unit,
   wherein, when the lid unit is closed, the light emitted from the light source unit is focused by the light focusing lens and then emitted to the incident surface of the second light guide body.

8. The storage box with illumination according to claim 7, wherein the light focusing lens is integrally formed with the first light guide body.

* * * * *